No. 695,588. Patented Mar. 18, 1902.
O. O. STORLE.
SELF GRINDING VALVE.
(Application filed Apr. 18, 1901.)
(No Model.)

WITNESSES

INVENTOR
Ole O. Storle

UNITED STATES PATENT OFFICE.

OLE O. STORLE, OF TACOMA, WASHINGTON.

SELF-GRINDING VALVE.

SPECIFICATION forming part of Letters Patent No. 695,588, dated March 18, 1902.

Application filed April 18, 1901. Serial No. 56,474. (No model.)

*To all whom it may concern:*

Be it known that I, OLE O. STORLE, a citizen of the United States, residing at Tacoma, in the county of Pierce and State of Washington, (my post-office address being Tacoma, Washington,) have invented certain new and useful Improvements in Self-Grinding Valves, of which the following is a specification.

My invention pertains to valves used to govern the flow of steam, air, gases, liquids, &c., through pipes.

The object of my invention is to provide a self-grinding disk in a valve, whereby the same may be so turned on the valve-seat as to keep both the seat and disk smooth and perfectly adjusted to each other. I attain this object by means of the device illustrated in the accompanying drawings, in which—

Figure 1:
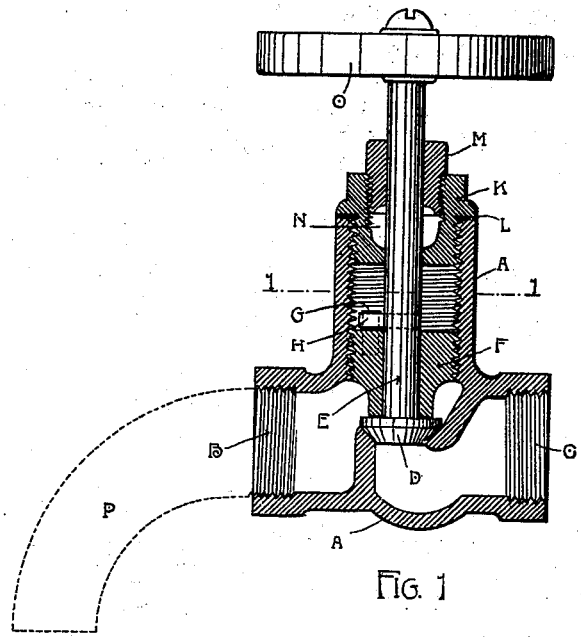
Figure 2:
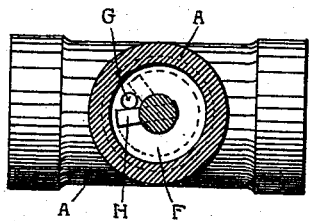

Figure 1 is a sectional drawing through the center of my invention, showing the valve-disk and shaft in elevation. Fig. 2 is a sectional view at 1 1, the lower part of Fig. 1 being shown in exterior elevation.

Similar letters refer to similar parts in the two figures.

My invention comprises a valve-body A of a form similar to other valves and has interior screw-threads cut the full length of the neck thereof, as shown in Fig. 1. Threads are also cut into the right and left ends of the valve-casing, as seen at B and C, in order that pipes may be connected therewith. The novelty of my invention is in the manner in which the valve-disk D is operated. The disk D is firmly attached to the shaft E. The nut F is loosely fitted on shaft E and threaded to screw into the neck of the valve-body A. A pin G is set rigidly into F, and in the shaft D a fixed pin H is so located as to engage pin G when the shaft E is turned. The neck of the valve is closed by the interior nut K, screwed into its end, with a circular packing at L to make a tight joint. The joint around the shaft E is made tight by means of the interior packing-nut M, with packing in the space N. The hand-wheel O completes the valve for service.

The valve is closed by turning the shaft E to the right. The fixed pin H engages the pin G and screws the interior nut F down the neck of the valve till the frustum-shaped disk D is set tightly in its seat in the body of the valve, as seen in Fig. 1. The valve-seat is designed to fit disk D to a nicety and make a tight joint. Should the seat at any time become rough or any substance get between the seat and the disk D, the shaft E is to be turned backward, thus causing the disk D to grind in its seat till the pin H again engages pin G, then reversed and turned forward again. This motion can be continued indefinitely till the disk D is free of obstruction and fits smoothly and tightly in the seat of the valve and closes the same perfectly. To open the valve, the shaft is turned to the left until the pin H engages the pin G, by means of which the interior nut F is turned and lifts the valve-disk D from its seat, allowing liquid, vapor, or gaseous material to flow through the same.

My valve is designed for straight lines of pipes screwed into the same at B and C or for a faucet, as indicated by broken lines at P, and for other purposes for which valves are required.

Having thus described my invention, what I do claim as new and useful, and desire to secure by Letters Patent, is—

1. A combined valve and seat grinding device comprising a movable apertured member forming a part of the valve, a shaft passing through the aperture of said member and carrying a valve-gate between said member and the valve-seat, said shaft being revoluble in said member, and a connection between said member and shaft adapted to permit the shaft and its valve-gate to turn without moving said member and by a further rotation of the shaft to adjust said member to seat and unseat the valve-gate, substantially as described.

2. A combined valve and seat grinding device comprising a movable apertured member forming a part of the valve, a shaft passing through the aperture of said member and carrying a valve-gate between said member and the valve-seat, said shaft being revoluble in said member, and projections on said member and shaft adapted to be brought into and out of engagement with each other by rotation of the shaft whereby when in engagement the shaft and member will be moved together and when out of engagement the shaft will move independently of the member, substantially as described.

3. A combined valve and seat grinding device comprising a movable apertured member formed with screw-threads adapted to engage with threads on a part of a valve-casing, a shaft passing through the aperture of said member and carrying a valve-gate between said member and the valve-seat, said shaft being revoluble in said member, and a connection between said member and shaft adapted to permit the shaft and its valve-gate to turn without moving said member and by a further rotation of the shaft to screw or unscrew said member to seat and hold the valve-gate to its seat and by rotation in the opposite direction to unseat said valve, substantially as described.

4. A self-grinding valve comprising a suitably-constructed valve-body, a valve-disk and shaft located therein and having a cylindrical interior nut loosely mounted thereon, a fixed pin or tooth projecting from said nut and shaft so as to engage each other when the shaft is turned to the right or left, and said valve disk or gate left free to turn on its seat between the right and left engagements of said fixed pins or teeth as described and shown and for the purposes set forth.

5. A self-grinding valve, comprising a valve-disk and shaft, a cylindrical nut loosely mounted thereon, said cylindrical nut turned by engaging pins, suitably fixed in said nut and shaft, and said valve-disk being free to turn on its seat between the right and left engagements of said fixed pins, and all operated in a suitably-constructed valve-body as described and shown.

6. A suitably-constructed valve having a self-grinding disk or gate, said disk or gate being free to turn on its seat between the right and left engagements of the mechanism of its operating shaft and screw as described and shown.

In testimony whereof I affix my signature in the presence of two witnesses.

OLE O. STORLE.

Witnesses:
G. W. BULLARD,
JAMES A. MARTIN.